(12) United States Patent
McCann

(10) Patent No.: US 6,568,699 B2
(45) Date of Patent: May 27, 2003

(54) ADJUSTABLE SISSY BAR MECHANISM FOR USE WITH A MOTORCYCLE

(76) Inventor: Gilbert McCann, 1705 Stocker Ave., Flint, MI (US) 48503

( * ) Notice: Subject to any disclaimer, the term of this patent is extended or adjusted under 35 U.S.C. 154(b) by 0 days.

(21) Appl. No.: 09/920,163

(22) Filed: Aug. 1, 2001

(65) Prior Publication Data
US 2003/0025290 A1 Feb. 6, 2003

(51) Int. Cl.$^7$ ................................................. B62J 1/28
(52) U.S. Cl. ........................ 280/304.4; 297/354.13; 297/215.2; 224/412
(58) Field of Search .................... 280/202, 288.4, 280/304.3, 304.4; 297/354.13, 195.1, 215.1, 215.11, 215.12; 480/219; 224/400, 412, 413, 416

(56) References Cited

U.S. PATENT DOCUMENTS

| | | | |
|---|---|---|---|
| 3,549,172 A | 12/1970 | McBroom | 280/202 |
| 3,625,405 A | 12/1971 | Kezar et al. | 224/32 A |
| 3,822,917 A | 7/1974 | George | 297/195 |
| 3,850,353 A | 11/1974 | Foulds | 224/31 |
| 3,887,231 A | 6/1975 | Bochynsky | 297/366 |
| 3,899,209 A | 8/1975 | Schultz | 297/383 |
| 3,901,534 A * | 8/1975 | Popken | 137/860 |
| 4,030,750 A | 6/1977 | Abram | 297/375 |
| 4,032,189 A | 6/1977 | Benavente et al. | 297/352 |
| D271,867 S | 12/1983 | Danielson | D12/119 |
| 4,440,330 A * | 4/1984 | Goodman | 224/413 |
| 4,466,660 A | 8/1984 | Mabie | 297/195 |
| 4,570,998 A | 2/1986 | Hughes | 297/353 |
| 4,953,911 A | 9/1990 | Hanagan | 297/195 |
| 4,993,731 A | 2/1991 | Fuller | 280/202 |
| 5,026,119 A | 6/1991 | Frank et al. | 297/383 |
| D332,540 S | 1/1993 | Peterson | D6/502 |
| 5,441,330 A | 8/1995 | Rojas | 297/383 |
| 5,468,052 A | 11/1995 | Vaughn | 297/352 |
| 5,501,168 A | 3/1996 | Zachary | 114/363 |
| 5,518,291 A | 5/1996 | Shaide | 297/215.12 |
| 5,588,698 A | 12/1996 | Hsueh | 297/184.11 |
| 5,667,232 A | 9/1997 | Gogan et al. | 280/202 |
| D385,515 S | 10/1997 | Gogan et al. | D12/114 |
| D386,131 S | 11/1997 | Gogan et al. | D12/114 |
| 5,725,138 A | 3/1998 | Zagrodnik | 224/413 |
| D394,234 S | 5/1998 | Gogan et al. | D12/114 |
| 5,779,303 A | 7/1998 | Kuelbs et al. | 297/215.11 |
| 5,931,360 A | 8/1999 | Reichert | 224/413 |
| D415,980 S | 11/1999 | Wright | D12/114 |
| 5,997,088 A | 12/1999 | Stark et al. | 297/354.13 |
| 6,007,150 A | 12/1999 | Clerkin et al. | 297/215.12 |
| 6,135,473 A | 10/2000 | Wright | 280/202 |

* cited by examiner

*Primary Examiner*—Kevin Hurley
(74) *Attorney, Agent, or Firm*—Gifford, Krass, Groh, Sprinkle, Anderson & Citkowski, P.C.

(57) ABSTRACT

An adjustable sissy bar mechanism for use with a cycle vehicle, such as a motorcycle, and which includes a body supported upon rotatable front and rear wheels and a seat secured atop the body. The sissy bar mechanism includes a pair of substantially planar plate-shaped members, each of the plate members being fixedly secured to the frame in aligning fashion and on opposite sides of the seat. An elongate and arcuately configured sissy bar has a central extending portion and first and second interconnecting and extending ends. The ends of the sissy bar are engaged with each of the plate shaped members in a plurality of differing and pivotally associated positions including first and second rider incline positions and a luggage rack carrying position, and in which said sissy bar is arranged substantially level with a horizontal plane.

11 Claims, 4 Drawing Sheets

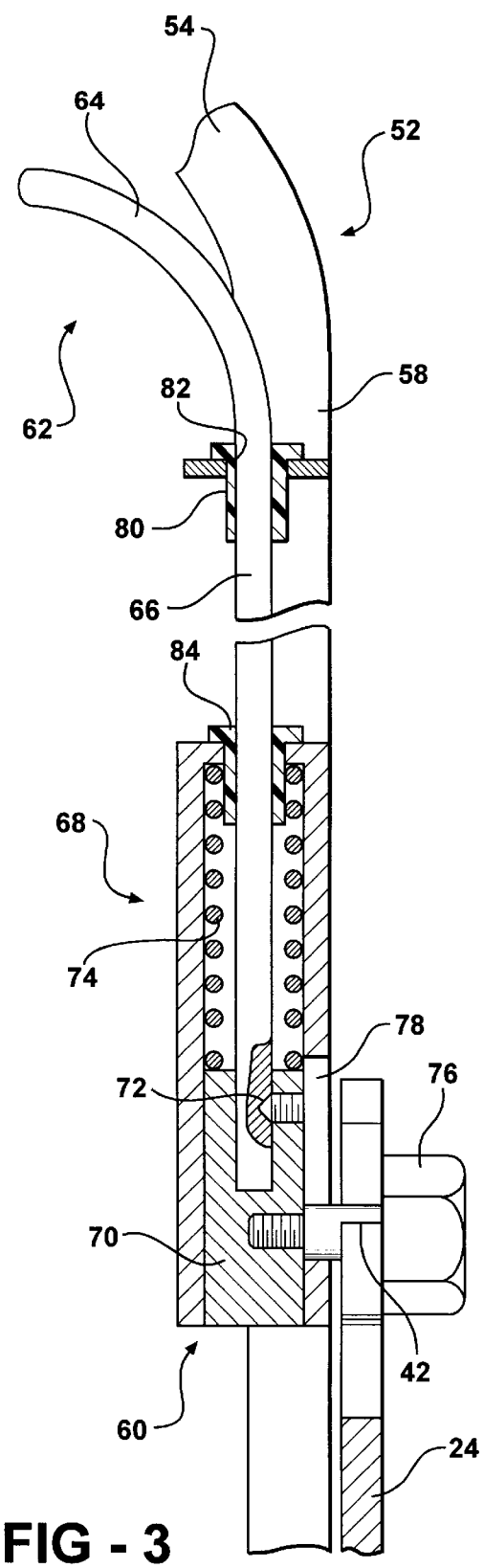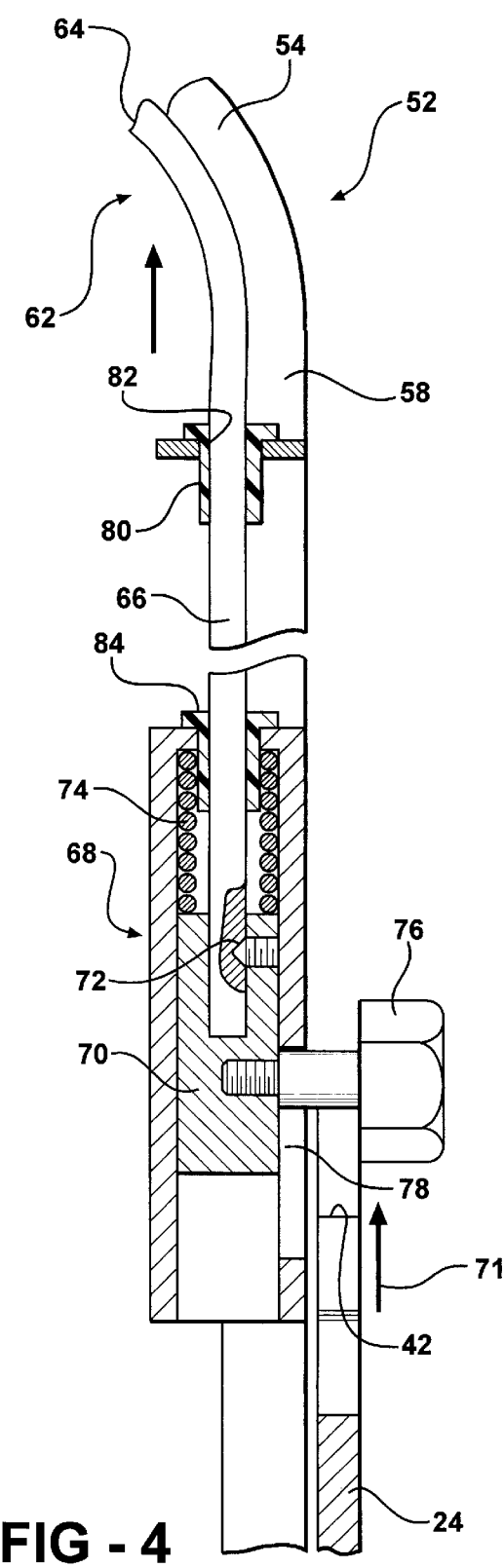

ADJUSTABLE SISSY BAR MECHANISM FOR USE WITH A MOTORCYCLE

BACKGROUND OF THE INVENTION

1. Field of the Invention

The present invention relates generally to seatback mechanisms for use with two and even three wheeled vehicles. More specifically, the present invention discloses an adjustable sissy bar mechanism for use with a motorcycle and which enables both a number of varying recline positions for a rider as well as a fully reclined position for use as a storage rack.

2. Description of the Prior Art

Seatback mechanisms are well known for use with motorcycles and similar two-wheeled vehicles. The idea behind the seatback is to provide a back support for a rider of such a motorcycle, and or to provide a cargo carrying support for items to be transported by the motorcycle operator.

Referring to FIG. 5A of the appended illustrations, a stock side plate assembly is illustrated at 2 according to the prior art. The side plate 2 is constructed of a steel material, for purposes of strength and durability, and includes a pair of apertures 4 along a bottom surface thereof and through which are inserted fasteners for mounting the side plate 2 to the motorcycle frame and at a rearward location of the motorcycle seat. As is known in the art, a pair of side plates 2 are provided and are attached to opposite sides of the motorcycle at the desired location.

Also included with each side plate 2 is a substantially square-shaped, elongate extending and internally hollowed piece of tubing 6 which is typically welded to the associated side plate 2. The tubing 6 can be provided on either face of the associated side plate 2, however it is typically associated with the inner facing surface of the plate. A sissy bar 8 is provided, this typically being an elongated bar or rod shaped member in a substantially "U" shape and having extending first and second ends and an interconnecting central portion. The extending ends of the sissy bar 8 are secured within the receiving cavities of the square steel tubing 6 and may further be held in place by an appropriate fastener 10 (such as a bolt or screw).

The prior art sissy bar of FIG. 5A is also illustrated in the Advertisement Publication entitled Heritage Springer Double Bucket Seat, and with particular reference to Parts Nos. 51130-98 and 51132-98, Backrest and Sissy Bar Upright. Attention is also directed to U.S. Pat. No. 5,779,303, issued to Kuelbs et al., and which discloses a similar support bracket system for securing motorcycle backrests, again including flat planar support members, forward and rearward mounting members (for bolt securing the support members to the motorcycle), coupling members. Referring further to FIGS. 3 and 4 of Kuelbs, a retainer member (41) of the support member/plate is adapted for securing one of the first and second fastening arms of the motorcycle backrest.

Similarly, U.S. Pat. No. 4,993,731, issued to Fuller, teaches a quick-release variation of a motorcycle quick release sissy bar bracket with a pair of bracket plates overlaying and attachable to respective rear fender bars, in turn rigidly attached to the motorcycle. Coupling bolts and a spring biasing and locking means allow the entire sissy bar backrest assembly (including the side plates as best shown in FIG. 3) to pivot over a limited range.

Additional examples of detachable and prior art sissy bars are also illustrated in U.S. Pat. No. 5,667,232 and Design 394,234, 385,515 and 386,131, all of which are issued to Gogan et al. The Gogan references teach the provision of a latching mechanism each including a latch member and a locking member mounted on the respective side plates and which permit pivotal movement between unlatched and latched positions.

Finally, U.S. Pat. No. 3,822,917, issued to George, teaches an adjustable backrest for a seat for cycles and which includes two parallel tracks affixed to the bike frame and on either side of the seat. The backrest is slidably adjusted between the parallel tracks, with the backrest being movable between a position near the front to the extreme rear of the seat. The backrest is supported by two arms that extend downward and are slidably affixed to the two parallel tracks so that, in cooperation with a locking arrangement, permit the backrest to be locked in any desired angular position.

SUMMARY OF THE PRESENT INVENTION

The present invention discloses an adjustable sissy bar mechanism for use with a cycle vehicle, such as a motorcycle, and which is an improvement over the prior art in that it provides both a simplified and improved mechanism for allowing range of adjustability and secure engagement, in a given position, of the sissy bar relative to the motorcycle frame. In particular, the sissy bar mechanism is intended to provide at least first and second varying incline positions for a rider/passenger seated behind the operator of the motorcycle, as well as providing a further reclined and cargo/luggage carrying position. The cycle further includes a frame supported upon rotatable front and rear wheels, and with a seat secured atop the frame.

The sissy bar mechanism according to a preferred embodiment includes a pair of plate-shaped members having mounting apertures formed through bottom end portions and for fixedly secured to the frame in aligning fashion and on opposite sides of the seat. Each of the plate members further include aligning pivot locations, these typically including a further defined apertures within which is engaged a bolt fastener, engagement nut and washers. The plate members further each include an arcuately configured edge surface having at least one recessed channel defined therein and typically a plurality of individual channels which define at least a first and second inclined positions and a third cargo carrying position.

An elongate and arcuately configured sissy bar is provided, having a generally elongate and tubular structure with a central member and first and second interconnecting sides and which terminate in extending ends. Each of the extending ends is secured to the pivot location of the associated plate-shaped member, such as through an additional aperture formed through the engaging end of the associated side, and to pivotally associate the sissy bar with the plate-shaped members.

The preferred embodiment also contemplates a secondary bar having a substantially "U" shaped configuration and also including first and second extending sides associated with the respective first and second interconnecting side portions of the sissy bar. One embodiment provides integrally defined cylinder housings extending from the main sides of the sissy bar, as well as extending in axially extending fashion towards the pivoting end locations. The sides of the secondary bar are slidably engaged within the cylinder housing portions of the sissy bar and so that, upon being actuated upwardly by force directed on the secondary bar, actuated to disengage pins extending from side locations of each secondary bar from the recessed channels of the associated plate members within which they are normally engaged. The actuating mechanism further includes a spring biasing member which urges the pin to seat within the selected and recessed channel defined in each of the plate-shaped members. The first preferred embodiment further contemplates a slider portion extending with each of the cylinder housing and which is fixedly secured to an associated extending side of the secondary bar. The engagement pins are each fixedly to the associated slider portion and so that, upon actuation in a reverse direction and against the biasing force of the spring, the pin is unseated from the plate members and the sissy bar arm permitted to rotate.

A further preferred variant contemplates the extending sides of the secondary arm terminating in substantially perpendicular extending end portions, the coil spring being sufficiently reconfigured to interconnect each of the extending end portions with the fixed sides of the main sissy bar. Additionally, safety stop tabs may extend from surface locations of each plate-shaped members and to prevent inadvertent pivoting the sissy bar in the event of the pin accidentally disengaging from the associated seating channels.

A further manual version of the sissy bar mechanism substitutes the pivotal connection with a plurality of individual and circumferentially offset tubing portions integrally secured, such as by welding, to the side faces of the plate-shaped members. The tubing portions correspond to the pivotal positions defined in the previous embodiments and for the at least first and second inclined rider positions and third cargo carrying position. Apertures may be defined in each of the tubing portions and aligning locations of the extending ends of the sissy bar, a pin inserts into each aligning pair of apertures and restrains the sissy bar within the associated tubing portions.

BRIEF DESCRIPTION OF THE DRAWINGS

Reference will now be made to the attached drawings, when read in combination with the following detailed description, wherein like reference numerals refer to like parts throughout the several views, and in which:

FIG. 3 is a cutaway view taken along line 3—3 of FIG. 2 and illustrating the sissy bar in the engaged position of FIG. 2;

FIG. 4 is a similar cutaway view to that also illustrated in FIG. 3, and further showing the sissy bar in an upwardly actuated and disengaged position;

DETAILED DESCRIPTION OF THE PREFERRED EMBODIMENTS

Figure 1:
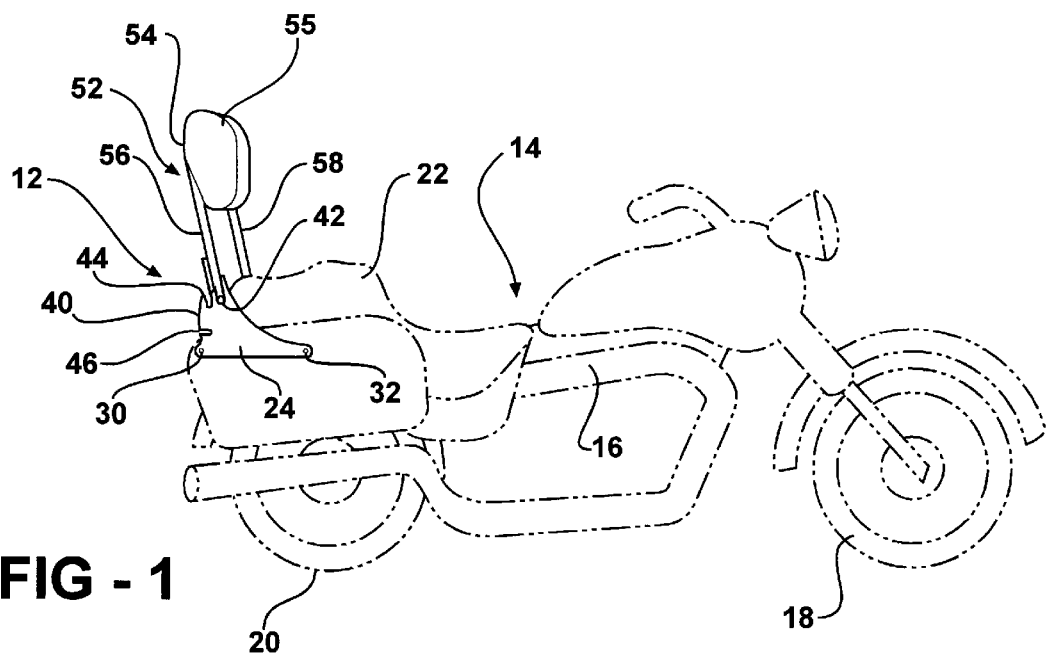
FIG. 1 is an environmental view illustrating the adjustable sissy bar mechanism according to a first preferred embodiment of the present invention secured to a motorcycle.

Referring now to FIG. 1, an adjustable sissy bar mechanism is illustrated at 12 for use with a cycle vehicle, such vehicle again including a motorcycle 14 or other suitable vehicle including a body 16 supported upon front 18 and rear 20 wheels and further including a seat 22 secured atop the body 16. In the preferred variant, the seat 22 is located towards the rear of the body 16 and is substantially elongated to accommodate seating of both an operator of the vehicle, as well as a rearwardly situated rider/passenger (not shown).

Referring again to FIG. 2, as well as to FIG. 3, a plate-shaped member 24 is illustrated and (specifically with reference to FIG. 2) is mounted to the vehicle body 16 aside the seat 22. As previously described, the present invention discloses a pair of such plate-shaped members, only one of which is evident in the side view of FIG. 1, and it is understood that an identically constructed and mirror-opposite plate member (not shown) is situated on a reverse side of the vehicle body 16 in FIG. 1 and in a spaced and aligning fashion relative to the other 24 of the plate-shaped members which is illustrated.

Referring again to FIG. 2, each plate-shaped member, see again 24, is constructed of a heavy duty and resilient material, such as a cold rolled steel or the like, and which includes a given planar shaped and substantially flattened configuration with receiving apertures 26 and 28 formed through said member 24 at bottom and end portions. Referring again to FIG. 1, mounting fasteners, 30 and 32, are inserted through the respective receiving apertures 26 and 28 and secure the given plate-shaped member 24 to the motorcycle body 16 and aside the rear end of the seat 22.

Each of the plate members further include aligning pivot locations, these typically including a further defined apertures (not shown but illustrated generally at 34 in FIG. 2) and within which is engaged a bolt fastener, engagement nut and washers (referenced at 36 and 38). As again has been previously described, the pivot locations can be located on either facing side of each plate-shaped member, however the preferred embodiment contemplates the pivot locations, and subsequent attachment of the sissy bar, to occur on the interior and opposing faces of the plate-shaped members 24 and as is illustrated in FIG. 1.

The plate members 24 further each include a specified and arcuately configured edge surface 40 having a plurality of individual and recessed channels defined therein. Specifically, and in the first preferred embodiment, first 42 and second 44 channels are illustrated and which define first and second corresponding inclined positions. A third channel 46 is defined at a further circumferentially arrayed location of the edge surface 40 and defines a third cargo carrying position. A horizontal plane is defined at 48, with each of the channels 42, 44 and 46 being arrayed at a specified angle thereto. The third and cargo carrying position defines the smallest angle, see angular directional arrow 50, and the first and second channels 42 and 44 define specified and greater angles (less than 90 degrees) adjustable for the cycle passenger.

An elongate and arcuately configured sissy bar is illustrated at 52 and includes a generally elongate and tubular structure with a central member 54 (such as to which is attached a backing cushion 55 (see again FIG. 1) and first 56 and second 58 interconnecting sides, the sides 56 and 58 terminating in extending ends (see end 60 for first side 56). As best illustrated in FIG. 2, each of the extending ends is secured to the pivot location of the associated plate-shaped member, see specifically end 60, by an aperture formed through the engaging end of the side which and is attached, fastener 36, nut and washer 38, in aligning fashion to the pivot aperture 34 and to pivotally associate the sissy bar 52 with the plate-shaped member 24.

Referring also to the cutaway views of FIGS. 3 and 4, the preferred embodiment also contemplates a secondary bar 62 having a substantially "U" shaped configuration and also including a central portion 64 and first and second extending sides (one of which is evident at 66 in FIGS. 2–4) and associated with the respective first and second interconnecting side portions of the sissy bar, such as again the side 66 being associated with the interconnecting side 58. Integrally defined cylinder housings, see at 68, extend from the associated side (56) of the sissy bar 52 in axially extending fashion towards the pivoting end locations.

The sides of the secondary bar 62, illustrated again by side 66, are slidably engaged within the hollow interior of the cylinder housing 68 of the sissy bar 52. To this end, a slider portion, see at 70 in FIGS. 3 and 4, extends within the open interior of each of the cylinder housings (68), an associated and extending side 66 of the secondary bar 62 fixedly securing (see at 72) to the slider portion 70. An actuating mechanism of the sissy bar further includes a spring biasing member, such as a coil spring 74, which urges the slider portion 70, and laterally projecting pin 76, to seat within a selected and recessed channel defined in each of the plate-shaped members, and such as selected rider/inclined channel 42 illustrated in the phantom designation 52' of the sissy bar in FIG. 2. The laterally extending and engagement pins, again illustrated by the pin 76, is fixedly to the associated slider portion (70) and so that, upon actuation of the secondary handle 62 in a reverse direction (see at 71 in FIG. 4) and against the biasing force of the spring 74, the pin 76 is unseated from the plate member 24 and the overall sissy bar 52 permitted to rotate such as in a direction from the phantom illustration 52' in FIG. 2 to the solid illustration 52 (and corresponding to engagement with the third cargo carrying position channel 46).

Figure 2:
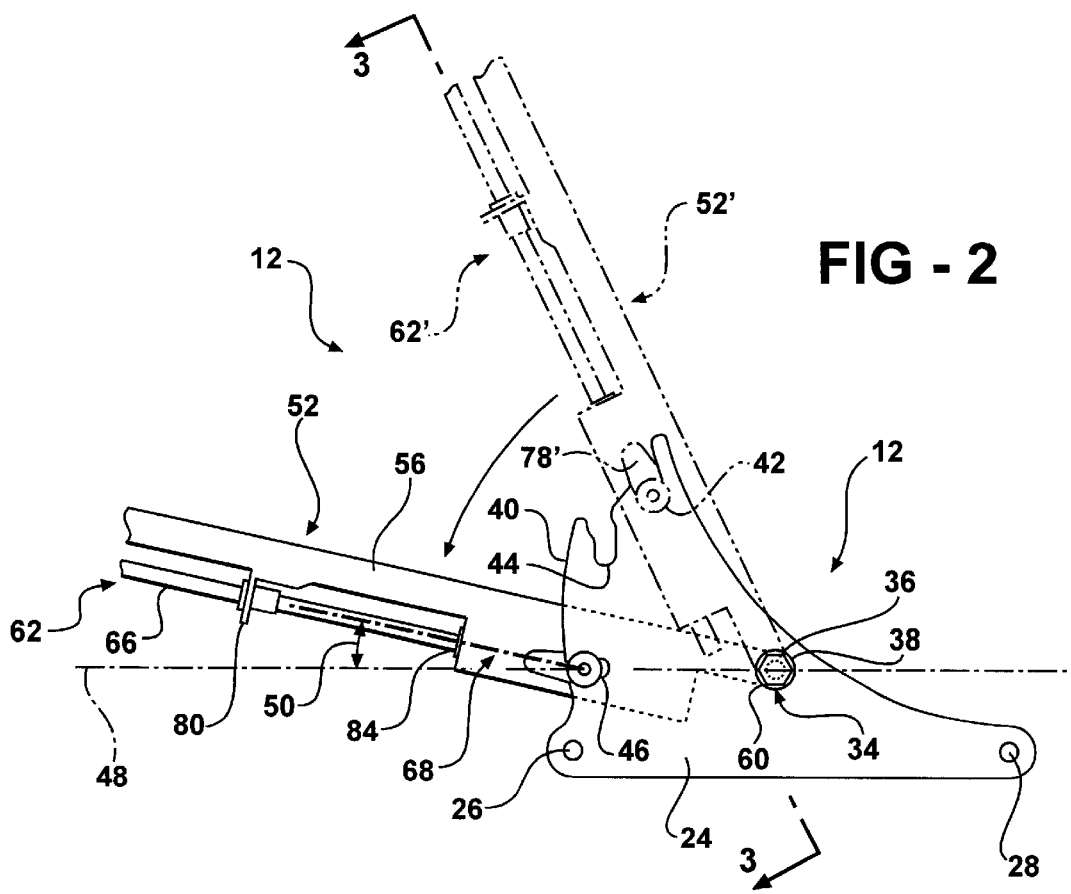
FIG. 2 is an enlarged side view of the sissy bar mechanism also shown in FIG. 1, and further illustrating the pivotal adjustment of the sissy bar according to the first preferred embodiment.

Additional features include the provision of a channel (see solid and phantom illustrations at 78 and 78') illustrated in each of the views of FIGS. 2, 3 and 4 and which provide the desired degree of travel required by the pin 76 between the engaged (FIG. 3) and disengaged (FIG. 4) positions with the plate member 24. Also, a guide extends from a selected location of each of the first and second sides of the sissy bar (see in particular guide 80 which extends from the side 58 of the sissy bar 52 and entrains therein side 66 of the secondary bar 62. The guide 80 includes a central aperture 82 (see particularly FIGS. 3 and 4) for slidingly receiving therein the associated side 66 of the secondary bar. Referring again to FIGS. 3 and 4, a sealing cap 84 is provided and is internally hollowed for permitting the secondary arm side (66) to insert therethrough and in fixed and restraining fashion relative to the slider 70 and coil spring 74).

Figure 7:
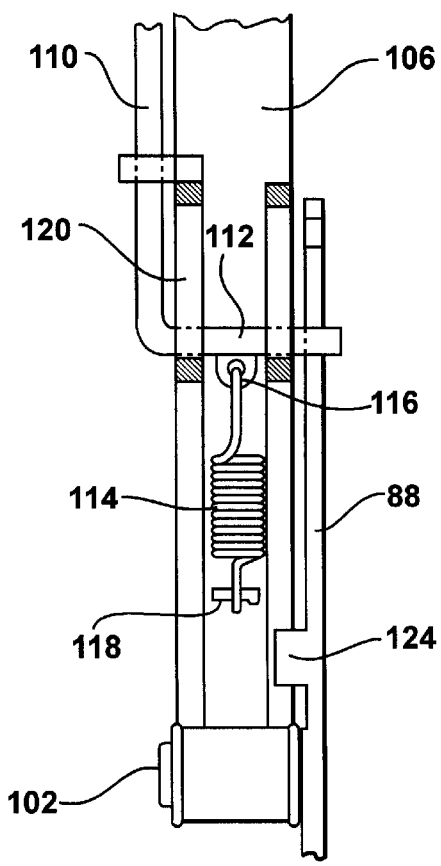
FIG. 7 is a cutaway view taken along line 7—7 of FIG. 6 and illustrating the alternate construction of spring actuating mechanism according to the preferred embodiment of the present invention.
Figure 6:
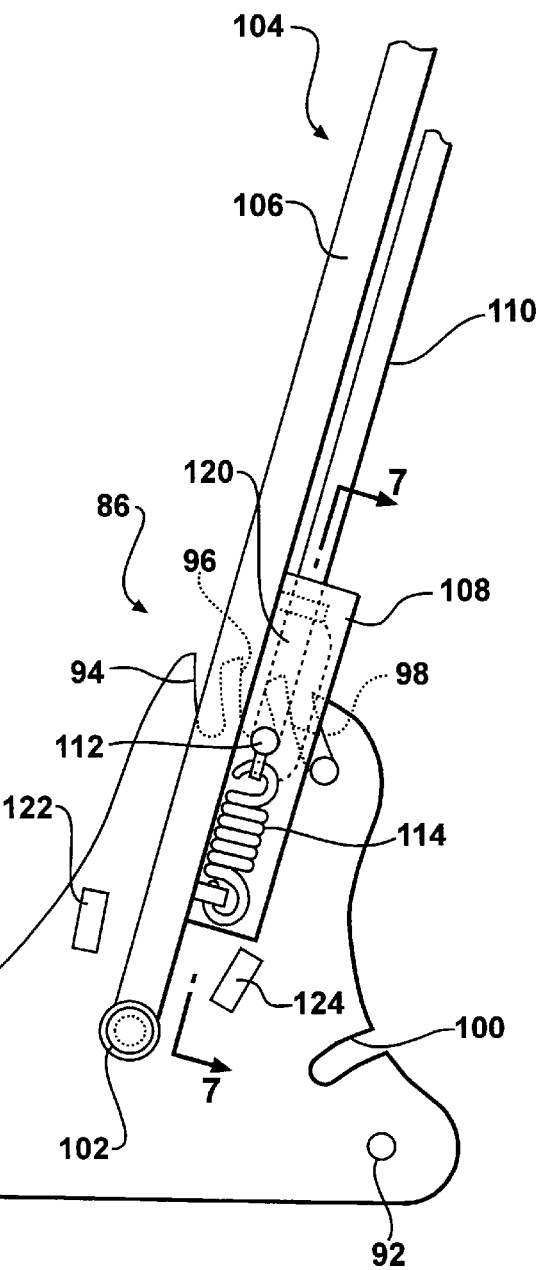
FIG. 6 is a side view of a sissy bar mechanism according to a yet further preferred embodiment of the present invention.

Referring to FIGS. 6 and 7, a further variant is illustrated at 86 of the adjustable sissy bar mechanism. The variant is largely similar to that previously disclosed at 12 in the embodiment of FIGS. 1–4, and again includes such features as a plate-shaped member 88, mounting apertures 90 and 92, and plurality of recessed engaging channels 94, 96, 98 and 100 and which define first, second and third rider inclined positions and a fourth, fully reclined and cargo carrying position. Additional repetitive features again include pivot location 102, to which is secured sissy bar 104 including extending side 106.

A housing 108 is defined in integrally and axially extending fashion along the associated side 106 of the sissy bar and an extending side 110 of a secondary arm inserts within the housing 108 (see in phantom illustration of FIG. 6). Referring to both FIGS. 6 and 7, the further preferred variant contemplates the extending sides (again side 110) of the secondary arm terminating in substantially perpendicular extending end portions, such illustrated end portion 112. A coil spring 114 is reconfigured (relative to that also illustrated at 74) with first 116 and second 118 extending and curled ends and which are secured, respectively, to angled end portion 112 and a fixed location of the main sissy bar 106.

Actuation of the sissy bar, such as again through upward force generated by the secondary bar (interconnecting to side 106), causes the pin, or in this case the terminating end of the end portion 112, causes the pin/end portion 112 to unseat from the selected plate member channel, specifically channel 96 illustrated in FIG. 6. A range of travel of the pin/end portion 112 is illustrated at 120 and permits the disengagement of the pin and subsequent rotation of the sissy bar. Additionally, safety stop tabs 122 and 124 may extend from surface locations of each plate-shaped member (88) and to prevent inadvertent pivoting the sissy bar in the event of the pin accidentally disengaging from the associated seating channels. Although not clearly illustrated in FIGS. 6 and 7, it is also understood that the stop tabs 122 and 124 can either be removed or reconfigured to be collapsible in substantially flush manner against the surface of the plate member 88 and to permit the sissy bar to be rotated between the selected channels.

Figure 5A:
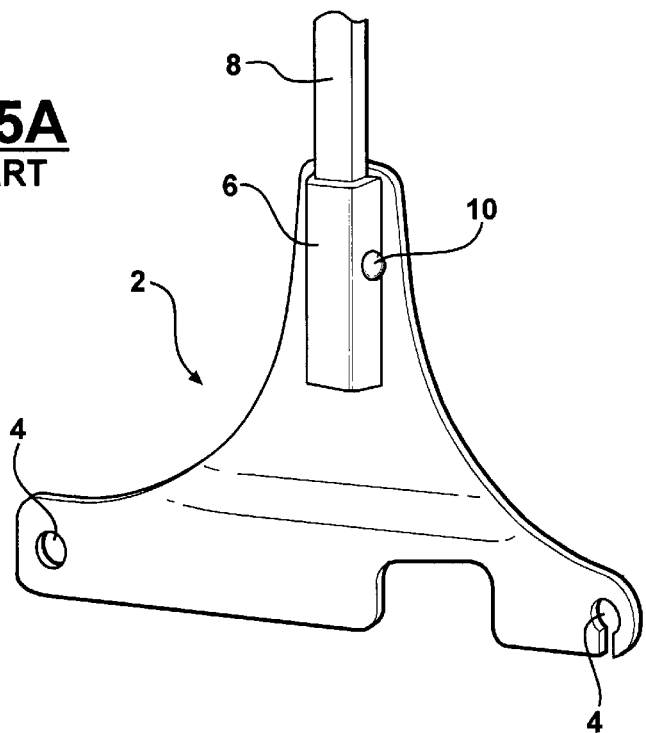
FIG. 5A is an illustration of a prior art and stock side plate and engageable sissy bar.
Figure 5B:
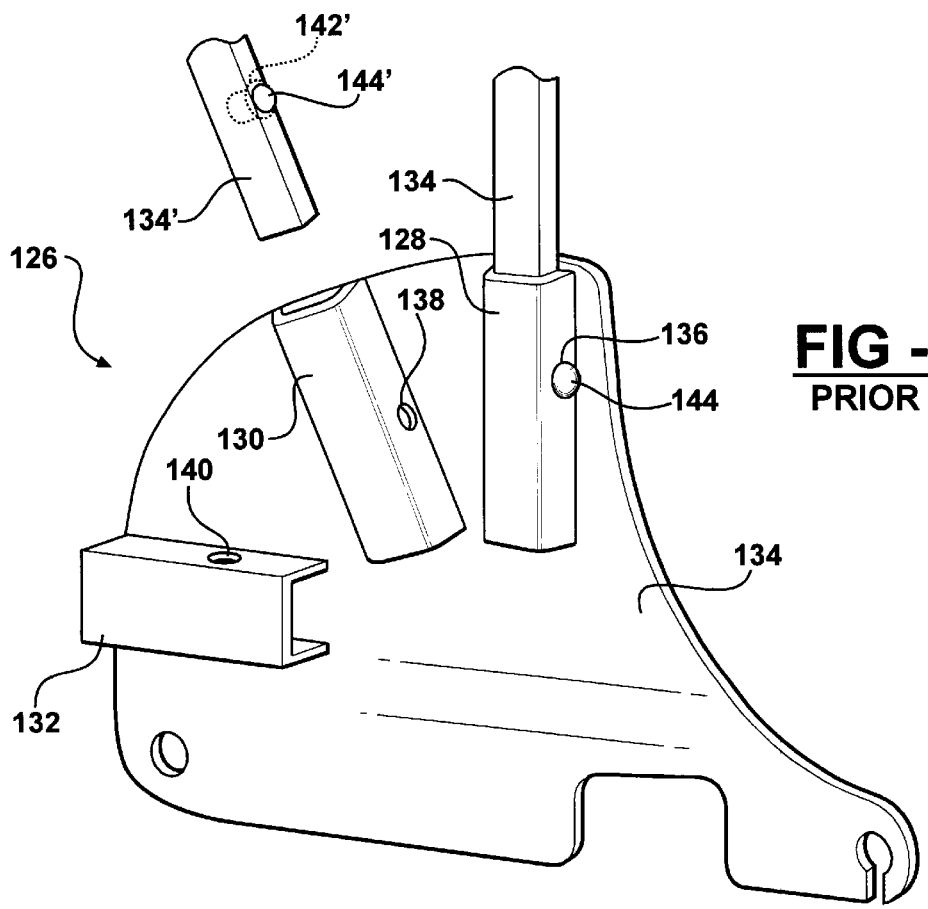
FIG. 5B is an illustration of a manually adjustable sissy bar mechanism according to a further preferred embodiment of the present invention.

Referring finally to FIG. 5B, a further manual version of the sissy bar mechanism is illustrated at 126 and substitutes the pivotal connection of the primary embodiments with a plurality of individual and circumferentially offset tubing portions 128, 130 and 132 integrally secured, such as by welding, to a selected side face of the associated plate-shaped member (134). The tubing portions 128, 130 and 132 are preferably square-shaped in configuration to match that of the engaging sissy bar (see at 134) and further correspond to the pivotal positions defined in the previous embodiments and for the at least first (128) and second (130) inclined rider positions and third (132) cargo carrying position.

Apertures may be defined in each of the tubing portions (see at 136, 138 and 140, respectively, for each of the tubing portions 128, 130 and 132). An additional aperture (see at 142' for phantom designation 134' of sissy bar) provides an aligning location of the extending and associated end of the sissy bar. A pin (144 and 144' for both solid and phantom position illustrations) inserts into each aligning pair of apertures and restrains the sissy bar within the associated tubing portion (tubing portion 128 in solid representation, as well as exploded with respect to tubing portion 130 in phantom illustration). A further preferred variant contemplates a spring pin being provided, which is fixedly secured in actuable and biasing fashion to the selected tubing portion (such as again at 128 and 144) and which permits the sissy bar arm 134 to snap-lock engage upon being inserted within the hollowed interior of the tubular portion 128.

It is therefore evident that the present invention discloses an adjustable sissy bar mechanism and which is a significant improvement over prior art sissy bar devices in that it provides both a non-obvious and improved simplification of structure for quickly and effectively adjusting the sissy arm between any one of a plurality of specified rider/inclined and cargo carrying positions. Having described my invention, additional preferred embodiments will become apparent to those skilled in the art to which it pertains and without deviating from the scope of the appended claims.

I claim:

1. An adjustable sissy bar mechanism for use with a cycle vehicle, the cycle including a body supported upon rotatable front and rear wheels, a seat being secured atop the body, said sissy bar mechanism comprising:

a pair of plate-shaped members fixedly secured to the body in aligning fashion and on opposite sides of the seat, each of said plate members further including aligning pivot locations, said plate members further including an arcuately configured edge surface having at least one recessed channel defined therein;

an elongate and arcuately configured sissy bar having a central member and first and second interconnecting sides which terminate in extending ends, each of said extending ends being secured to said pivot location of said associated plate-shaped member to pivotally associate said sissy bar therewith;

a secondary bar having a substantially "U" shaped configuration with first and second extending sides associated with respective first and second interconnecting side portions of said sissy bar, an engagement pin extending from a selected side location of each secondary bar and seating, in a first position, within a recessed channel of an associated plate member; and an actuating mechanism being engaged to displace said extending sides of said secondary bar, relative to said associated sides of said sissy bar, and disengaging said engagement pins from said associated recessed channels, said sissy bar being rotated to a further selected position, whereupon said spring-actuated mechanism is released to thereby permit said engagement pins to re-engage said plate members within further selected recessed channels.

2. The adjustable sissy bar mechanism as described in claim 1, said at least one recessed channel further comprising a plurality of individual channels defining at least a first inclined position, a second inclined position and a third cargo carrying position.

3. The adjustable sissy bar mechanism as described in claim 1, further comprising a cylinder housing defining an integral and axially extending portion of each of said interconnecting sides of said sissy bar, said extending sides of said secondary bar being slidably engaged within said associated cylinder housing.

4. The adjustable sissy bar mechanism as described in claim 3, said actuating mechanism further comprising a coil spring disposed within each of said cylinder housings.

5. The adjustable sissy bar mechanism as described in claim 4, further comprising a slider portion extending within each of said cylinder housings and fixedly secured to an associated extending side of said secondary bar, said engagement pins each being fixedly secured to said associated slider portion.

6. The adjustable sissy bar mechanism as described in claim 1, further comprising said extending sides of said secondary bar terminating in substantially perpendicular extending end portions, said actuating mechanism further including a coil spring interconnecting each of said extending end portions of said secondary bar and said associated side of said sissy bar.

7. The adjustable sissy bar mechanism as described in claim 6, further comprising at least one safety stop tab extending from a surface location of each plate-shaped member, said stop tab preventing inadvertent pivoting of said sissy bar.

8. The adjustable sissy bar mechanism as described in claim 3, further comprising a guide extending from selected locations of each of said first and second sides of said sissy bar, said guide including a central aperture for slidingly receiving therein an associated side of said secondary bar.

9. An adjustable sissy bar mechanism for use with a cycle vehicle, the cycle including a body supported upon rotatable front and rear wheels, a seat being secured atop the body, said sissy bar mechanism comprising:

a pair of plate-shaped members fixedly secured to the body in aligning fashion and on opposite sides of the seat, each of said plate members further including aligning pivot locations, said plate members further including an arcuately configured edge surface having at least one recessed channel defined therein;

an elongate and arcuately configured sissy bar having a central member and first and second interconnecting sides which terminate in extending ends, each of said extending ends being secured to said pivot location of said associated plate-shaped member;

engagement pins extending from selected side locations of said sissy bar and, in a first position, engaging within a recessed channel of an associated plate shaped member; and a coil spring-actuate mechanism incorporated into a cylinder housing defining an integral and axially extending portion of each of said interconnecting sides of said sissy bar and being engaged to displace said engagement pins from said associated recessed channels, said sissy bar being rotated to a further selected position, whereupon said engagement pins re-engage said plate members within further selected recessed channels.

10. An adjustable sissy bar mechanism for use with a cycle vehicle, the cycle including a body supported upon rotatable front and rear wheels, a seat being secured atop the body, said sissy bar mechanism comprising:

a pair of substantially planar plate-shaped members, each of said plate members being fixedly secured to the body in aligning fashion and on opposite sides of the seat;

an elongate and arcuately configured sissy bar having first and second extending ends; and receiving means associated with each of said plate shaped members and for engaging said extending ends of said sissy bar in an established and fixed pivotal arrangement, said pivotal arrangement further defining at least one incline position for arranging said sissy bar at a specified angle relative to a horizontal plane, said pivotal arrangement further defining a luggage rack position and in which said sissy bar is arranged substantially level with said horizontal plane, said receiving means further comprising a plurality of elongated and internally hollowed tubing portions integrally defined in arrayed fashion upon a specified surface of each of said plate-shaped members.

11. the adjustable sissy bar mechanism as described in claim 10, further comprising apertures defined in each of said tubing portions and aligning locations of said extending ends of said siss bar, a pin inserting into each aligning pair of apertures and restraining said sissy bar within said tubing portions.

* * * * *